Jan. 28, 1969 P. VILLERS ET AL 3,424,624

THERMOPILE RADIATION DETECTOR SYSTEM

Filed May 25, 1965

INVENTORS.
PHILIPPE VILLERS
GERALD FALBEL
BY
Robert ... [signature]
ATTORNEY

United States Patent Office 3,424,624

Patented Jan. 28, 1969

3,424,624

THERMOPILE RADIATION DETECTOR SYSTEM

Philippe Villers, Wilton, and Gerald Falbel, Stamford, Conn., assignors to Barnes Engineering Company, Stamford, Conn., a corporation of Delaware Filed May 25, 1965, Ser. No. 458,737
U.S. Cl. 136—213 11 Claims
Int. Cl. H01u *1/32*; G01k *7/12*

ABSTRACT OF THE DISCLOSURE

Thermopiles are prepared with a heat sink of material of high heat conductivity, such as aluminum, having holes or openings with a thin film of electrically insulating material stretched across the heat sink and bridging the openings. On one side of the electrically insulating film is a thin film of metal such as gold with an annular gap separating a portion of each hole from the remainder. The gold in the middle of the opening is provided with a radiation-absorbing black coating. On the other side of the electrically insulating film, junctions of thermopiles are deposited with the active junctions over the portion of the gold film which has been blackened and the reference junctions over a portion of the film which is in contact with the heat sink. The active junctions receive uniform heating from radiation striking the blackened portions of the gold film.

*Background of the invention*

Thermopiles have very desirable characteristics as radiation detectors and particularly for the detection of radiations in the infrared. As a thermopile responds to temperature, it is useful with any wavelength of radiation. Most instruments operating on radiation such as infrared utilize interrupted, or chopped, radiation, which permits A.C. amplifiers, and has other desirable features.

Considerable advance in thermopile construction involved the so-called solid-backed thermopiles, in which the thermopile is mounted on a heat sink with suitable insulation therefrom if it is electrically conductive. It should be realized that the heat sink in a solid-backed thermopile is only in conductive relation through a thin insulating substrate with the inactive junctions. The active junctions are mounted on the substrate, which portion is, however, not in thermal contact with the heat sink. In the case of a bolometer the heat sink is in conductive relation through a thin layer of material with the whole of the active material and also, in the case of the usual reference flake, with it. In bolometers the responsivity is directly affected by the thermal conductance through the thin dimension between the sensing material and the heat sink. In the case of thermopiles this is not true and, therefore, to reduce thermal capacitance, which is directly proportional to thickness, in a solid-backed thermopile the insulating layer should be as thin as possible, consistent with adequate mechanical strength to support the active junctions of the thermopile. Time constants of bolometers are primarily determined by the thermal mass of the sensitive material and the thickness of the insulating layer. The latter has negligible effect on the thermal conductance of a thermopile. It does, however, affect thermal capacitance significantly. In these important characteristics, therefore, thermopiles behave entirely differently from bolometers.

Problems have arisen with ordinary thermopiles, including those of the solid-backed type, some of the problems being electrical, and others being thermal. One of the thermal problems is to reduce the mass of the active junctions of the thermopile, which results in greater response for a given amount of absorbed radiation. However, as in many other instruments, the size of active junctions cannot be reduced to very small areas because the amount of radiation received for a given quality of optics in the instrument becomes smaller if the size of the active junctions of the thermopile are too minute. Also, excessive reduction in dimensions can present problems of mechanical strength. As a result, all thermopiles which have been designed up to the present time have been compromises.

*Summary of the invention*

The present invention produces thermopiles in which there is no compromise, or the amount of compromise is very drastically reduced. Essentially, the present invention solves the problems presented by completely isolating the thermal and electrical characteristics so that each can be optimized. To understand the operation of the present invention, it is desirable to give very brief consideration to the normal construction of a solid-backed thermopile. Normally the heat sink, which may be a block of aluminum or other material of high thermal conductivity, is provided with holes or recesses over which there is stretched a thin layer of electrically insulating material, one of the best materials being polyglycol terephthalate, which is sold in sheet form under the trade name "Mylar." For simplicity, in the remainder of the specification this trade name will be used, without intending to limit the invention to materials sold under this name. Also, Mylar is described only as a typical substrate, and any other plastic or other insulating material which can be obtained in uniform, thin sheet form can be used, for example, sheets of polyolefins. Because of its good thermal characteristics and high mechanical strength Mylar is the preferred material for use in thermopiles of the present invention.

When the thin film of Mylar, for example of the order of magnitude of .12 to .25 mil, is stretched across the substrate with its recesses or openings there are alternating zones which are in good thermal contact with the heat sink, and other zones which are thermally insulated therefrom by spaces which contain gases or a vacuum, depending on the environment in which the thermopile is to be used. The thermopile active junctions are deposited in the zone of the substrate which is thermally insulated from the heat sink whereas the inactive or reference junctions are on the substrate in a zone where it is in good thermal contact with the heat sink. As a result, the reference junctions are substantially at heat sink temperature, and the active junctions can be heated up or cooled down by receiving radiation. The thermopile puts out a voltage which is caused by the difference in temperature between the active junctions and the reference junctions, and which may be a D.C. voltage or an A.C. voltage, depending on whether the incoming radiation is continuous or chopped. In the case of radial thermopiles, with the active junctions being on the inner periphery and the deference junctions on an annulus slightly removed therefrom, it is customary, or at least common, to provide circular holes in the heat sink underneath the portion of the substrate carrying the active junctions. In the case of thermopiles where the junctions are arranged in rows, grooved or slotted heat sinks are preferable. As the present invention requires actual openings in the heat sink, it is particularly applicable to radial thermopiles, although not limited thereto, and this form of construction therefore constitutes a preferred embodiment of the invention.

In order to effect the purpose of the present invention, namely a separation of the thermal parts of the thermopile from the electrical, radiation is caused to strike, not the active junctions of the thermopile directly, but the back of the thin substrate on which they are deposited. As in all radiation detectors, it is necessary to use blackening in order to increase the absorption of the radiation.

While it is possible to apply blackening to one side of the thin substrate opposite the active junctions, it is highly desirable, and so constitutes a preferred embodiment, that the side of the substrate which is blackened also carry a thin film of a material of very high conductivity, on which the blackening is deposited or otherwise placed. Such films may be vacuum deposited gold or silver films, and can be quite thin, for example of the order of one or a few microns. The thermal diffusivity of the material is so great that even thin films will produce sufficient heat transfer so that there will be a uniform temperature on the back of the substrate over which the active junctions are deposited. The thermal uniformity produced solves a number of problems in addition to the basic ones solved by the separation of the thermal and electrical parts of the thermopile. Thus, for example, if the thermopiles are used in an instrument which may receive minute images of very small targets, the area covered by the target image is very much smaller than the area of the active junctions, and it is a complete physical impossibility to produce a thermopile with absolutely uniform active junctions, and any small difference in junction sensitivity will produce a different response to target images that fall on different parts of the active junctions. This is a spurious result and is completely eliminated by the preferred modification of the present invention in which there is a thin film of material of high heat conductivity. This produces complete thermal uniformity and at the same time distributes the temperature change resulting from impinging radiations uniformly over the active junctions, which can increase the over-all sensitivity of the thermopile.

Important as the thin layer of high heat conductivity is for a single thermopile, it becomes absolutely essential for proper operation of instruments which have multiple thermopiles, and where the different thermopiles must be maintained at constant sensitivity. A further refinement in this respect will be described below, and permits calibrating or adjusting multiple thermopiles to constant sensitivity. Multiple thermopile instruments are of various types, one typical one being a horizon or planet sensor utilizing four overlapping mirrored cones with four detectors. An instrument of this type is described in the patent of Kallet and Collyer, No. 3,351,756, issued Nov. 7, 1967, and assigned to the assignee of the present application. It should be noted that the present invention does not, per se, have anything to do with the particular type of instrument in which it is used, and the multiple cone instrument is therefore mentioned only as a typical illustration of types of instruments in which the present invention can be employed. As this type of instrument illustrates the advantages of the present invention, the specific description below will describe the invention in connection with a multiple cone instrument.

Reference has been made to blackening the side of the Mylar substrate opposite the one on which the thermopile junctions have been deposited. In common with all radiation instruments the present invention is normally used with blackening, but the particular blackening employed has nothing to do with the invention as such, and should merely be suitable for the particular type of radiation in which the thermocouples are to be used. Typical blackening compositions are gold black, platinum black, finely divided silicon carbide lacquers, and the like, the last-named type of blackening being described in the Karlson application Ser. No. 379,335 filed June 30, 1964, and assigned to the assignee of the present invention. The silicon carbide blackening is particularly useful for thermopiles which are to receive radiation in the very far infrared.

The invention will be described in conjunction with thermopiles utilizing antimony and bismuth as metals for the junctions. For many instruments these materials are well suited, but the present invention is not concerned in any way with the particular materials of which the thermopile junctions are made, and other pairs of thermoelectric materials may be used, such as semiconductors germanium and silicon. The invention is not limited to any particular method of forming the junctions, but when materials such as antimony and bismuth are employed, a very common and a very effective method is to deposit the materials by vacuum deposition through suitable masks.

*Description of the preferred embodiments*

Figure 1:
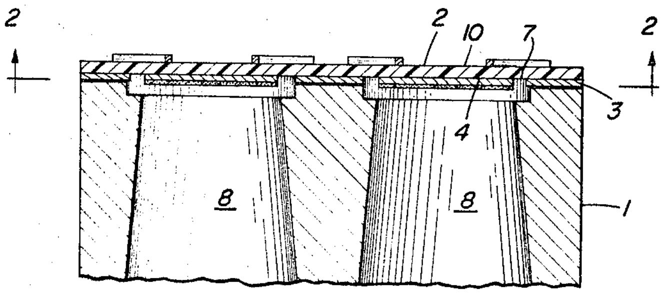
FIG. 1 is a section through part of a multiple cone detector package.

In FIG. 1 a heat sink of high conductivity material, such as aluminum, is shown at 1, with two adjacent conical openings 8. A .25 mil Mylar sheet 2 is stretched across the heat sink, and is attached thereto at points under the reference junctions by cementing in the conventional manner. Before the Mylar substrate is mounted on the heat sink, a thin film of gold is deposited on one side as is clearly shown in FIG. 2. In FIG. 1 the thickness, both of the Mylar substrate and the layer of gold 3, has been greatly exaggerated for clarity. The layer of gold will be typically one or a few microns. Isolated portions of the substrate 10 are then coated with gold black, which is shown at 4 in FIGS. 1 and 2.

The other side of the Mylar substrate carries thermopile junctions of bismuth 5 and antimony 6. These are deposited in the conventional manner, successively through masks of suitable openings, the thickness of the antimony and bismuth films being about $1\mu$ and $3\mu$ respectively.

Figure 2:
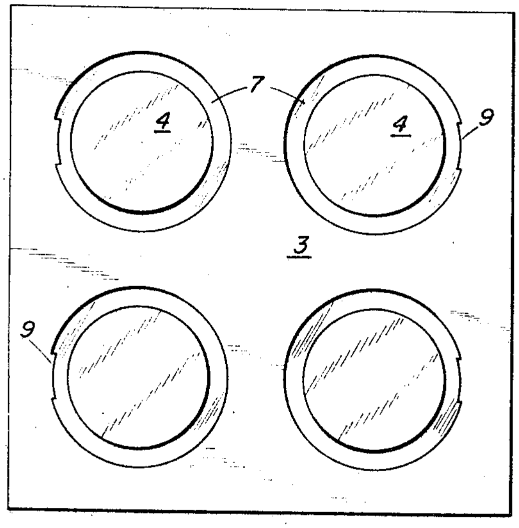
FIG. 2 is a plan view of the side of the Mylar substrate receiving radiation.

At the ends of a thermopile there are attached conventional leads, for example, of deposited gold, but as this is not changed by the present invention, for clarity they are not shown in FIGS. 1 and 2.

Figure 3:
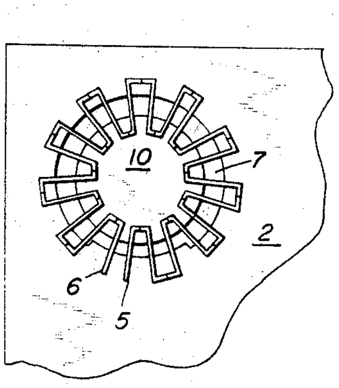
FIG. 3 is a detail plan view of the opposite side of the substrate, showing one thermopile.

It will be noted that there is an annular zone 7 with no gold, and this constitutes a thermal gap between gold areas 3 and 10, and is indicated in FIGS. 2 and 3. This gap separates the active junctions which are in good heat conductive relation to the blackened portions 4 from the reference junctions, which are in good heat conducting relation with the aluminum heat sink. It is possible to make a mask which will assure absolute concentricity of the areas 10 and the annular gap, and then the gap may be exactly the length of the connecting leads from the active junctions to the inactive junctions. It is preferred to make the gap narrower than the distance between active and passive junctions. A small portion of the layer 3 may extend into the gap as will be described below. This modification is of great practical convenience and constitutes a preferred embodiment, and is illustrated on the drawings.

It will be seen from an examination of FIG. 3, that the active junctions are very short, whereas they extend as long flags toward the center in the conventional radial thermopile. This greatly reduces the mass of the active junctions, and improves the speed of the thermopiles. Even with imperfect centering, it will be seen that the active junctions are located wholly over the area 4. This is assured by making the antimony and bismuth leads which connect the active junctions with the passive junctions slightly longer than the annular zone 7 to assure against any lack of perfect registry. This is also shown on the drawings. The detector diameter is quite small, typically about 2.5 mm., and of course the drawings are greatly magnified for clarity. With the dimensions indicated, time constants from 130 to 160 milliseconds are obtained. Response is very good when scanned over the thermopile, and there is no substantial difference in different areas, the thin gold layer effectively maintaining the temperature in the area 10 substantially constant for constant irradiation.

When multiple thermopiles are used, as is shown in FIG. 2, the sensitivity of each thermopile cannot be kept absolutely equal. However, in a more specific embodiment of the present invention, this problem is simply solved by having small trim areas of gold, shown at 9 on FIG. 2 extending into the gap between areas 3 and 10. By using a constant test radiation, the size of these trim areas in the mask can be varied until subsequently made sets of four thermopiles have exactly the same sensitivity. The trim areas are adjusted in the mask for a multiple thermopile either by a single calibration at the start, for example, by etching off small amounts of the mask, which may be of stainless steel, in the proper places or by providing the mask with an adjustable area. The present invention is concerned with the final thermopiles in which the trim areas in the thermal gap are precisely dimensioned, regardless of the particular method by which the masks are suitably calibrated. It is, of course, possible, although not desirable economically, to deposit oversized thin gold trim areas and remove portions of them after the multiple thermopile has been made. Although this procedure is much more costly in the case of a number of thermopiles, it is not excluded from the broader aspects of the invention. In the case of a single thermopile, the trim areas are not needed, but they constitute a desirable additional refinement when multiple thermopiles are required.

It will be noted that by having the thermal portions of the thermopiles physically separated from the electrical portions by being on different sides of the Mylar substrate, each can be designed for maximum efficiency without requiring any compromise. One of the results has been referred to above by the reduction in size of the active junctions when they no longer have to perform the additional function of radiation-receiving surface. By separating the electrical and thermal portions of the thermopile, it is also possible to simplify the mounting of leads from the thermopile. Thus, for example, an extension of the Mylar substrate may be provided with vacuum deposited flexible leads thereon. Such a construction as far as the leads are concerned does not form the subject matter of the present invention, but is described and claimed in the copending application of Villers, Ser. No. 458,712, filed May 25, 1965, and assigned to the assignee of the present invention. It is, however, an advantage of the present invention that the flexible leads may be employed without involving further problems.

In the description, each thermopile has been described as a single thermopile, that is to say, with all of the functions in series. For many purpose this is preferred, as it gives the maximum voltage and simplifies, therefore, the design of electronic processing circuits. With the tiny active junctions which are made possible by the present invention, thermopiles from 20 to over 300 junctions have been practically constructed. The features of the present invention, separating the thermal and electrical portions of the thermopile, are also useful with composite thermopiles in which there may be several organizations of thermopiles in a single unit, connected in parallel. Some of the advantages made possible by such constructions from the subject matter of the copending application of Villers and Pasternak, Ser. No. 495,986, filed Oct. 14, 1965, assigned to the assignee of the present invention and now abandoned. Multiple thermopiles, of course, do not form the subject of the present invention, but it is an advantage of the invention that it lends itself to the production of instruments having these features.

We claim:

1. A thermopile comprising, in combination,
(a) a heat sink of material of high heat conductivity having at least one opening therein of size suitable for the active junctions of a thermopile,
(b) a thin sheet of material of low thermal conductivity and electrical insulating property across the surface of said heat sink and bridging the openings therein, the sheet being in good heat conducting contact with the unbridged portions of the heat sink,
(c) at least a portion of each opening area of the sheet being coated on the side next to the heat sink with a thin layer of material of high heat diffusivity and high absorption for radiation in the wavelength bands for which the thermopile is to be used,
(d) a zone surrounding said radiation absorbing zone uncoated and constituting a thermal gap between the zones opposite the active thermopile junctions and the portion of the sheet in heat exchanging contact with the substrate,
(e) the other side of the sheet being provided with thermopile junctions, the active junctions being in heat exchanging relation through the sheet to the zone of high radiation absorption, and the reference junctions being in good heat exchanging relation through the thin sheet with the heat sink, leads connecting the junction extending across the thermal gap, and
(f) terminal leads for the thermopile.

2. A thermopile according to claim 1 in which the gap in the material of high heat diffusivity between active thermopile junctions and the inactive junctions is sufficiently shorter than the distance between active and passive thermopile junctions so that small errors of registration will not cause any part of the active junctions to extend into the thermal gap.

3. A thermopile according to claim 2 in which the sheet is a thin sheet of polyglycol terephthalate.

4. A thermopile according to claim 2 in which the zone of high radiation absorbency is formed of a thin film of metal of high heat diffusivity on the sheet, and a thin film of radiation absorbing material thereover.

5. A thermopile according to claim 3 in which the zone of high radiation absorbency is formed of a thin film of metal of high thermal diffusivity on the sheet, and a thin film of radiation absorbing material thereover.

6. A thermopile according to claim 5 in which the metal is a thin film of gold.

7. A multiple thermopile according to claim 5 in which the heat sink is provided with a plurality of openings, and the thin layer of metal of high thermal diffusivity extends from the uncoated area surrounding each area of high radiation absorbency, whereby lateral heat conductivity from one thermopile to another takes place and reduces temperature differences between thermopiles.

8. A multiple thermopile according to claim 6 in which the heat sink is provided with a plurality of openings, and the thin layer of metal of high thermal diffusivity extends from the uncoated area surrounding each area of high radiation absorbency, whereby lateral heat conductivity from one thermopile to another takes place and reduces temperature differences between thermopiles.

9. A multiple thermopile according to claim 7 in which the thermal gaps for the individual thermopiles are provided with calibrated small areas of material of high thermal diffusivity to match responsivities of the individual thermopiles.

10. A thermopile according to claim 2 in which the junctions are arranged radially.

11. A thermopile according to claim 3 in which the junctions are arranged radially.

References Cited

UNITED STATES PATENTS 3,075,386 1/1963 Daly ---------------- 73—355

OTHER REFERENCES

Klass, P. J.: "New Thin-Film Infrared Sensor Developed," Aviation Week and Space Technology, pp. 91–97, May 20, 1963.

WINSTON A. DOUGLAS, *Primary Examiner.*

M. J. ANDREWS, *Assistant Examiner.*